Dec. 1, 1964 W. C. WIEDEMANN 3,159,801

PHASE MODULATOR

Filed Feb. 15, 1961

INVENTOR.
WARREN C. WIEDEMANN
BY Spencer E. Olson
ATTORNEY 3,159,801
PHASE MODULATOR
Warren C. Wiedemann, Tonawanda, N.Y., assignor to Sylvania Electric Products Inc., a corporation of Delaware
Filed Feb. 15, 1961, Ser. No. 89,467
1 Claim. (Cl. 332—30)

This invention relates generally to angle modulation systems, and more particularly to a circuit for phase modulating a carrier signal.

It is standard practice in communication systems to transmit low frequency or audio signals by using such signals to modulate a high frequency carrier wave. Such a carrier wave may then be transmitted either over wire lines or by radio. Because of the ability of a frequency modulation receiver to be made insensitive to amplitude variations in the received signal, such as those caused by noise, angle modulation is extensively used in communications systems. A wide variety of angle modulation circuits are known to the art; they include frequency modulated oscillators, phase modulators having a crystal controlled carrier source, and combinations of phase and frequency modulation. Phase modulation is employed when a small transmitter having crystal controlled stability and relatively simple circuitry is required. A number of phase modulation circuits are known, perhaps the most familiar being the reactance-tube phase modulator which employs a vacuum tube as a variable reactance in a phase shifting circuit to permit variation of the phase of an applied crystal controlled carrier wave at an audio rate. This form of modulator has found wide acceptance and is currently in use in many applications. However, with the advent of transistors and other solid-state electronic components, a reactance tube modulator places serious restrictions on the ability to design a solid-state communications transmitter, at least those portions of the circuit preceding the output power amplifier. This is particularly significant in mobile communication systems where emphasis is constantly directed to a reduction in the space and weight of the transmitter as well as its power requirements.

The present invention is directed to a simplified phase modulator circuit wherein a transistor is used in combination with a variable reactance circuit, the reactance of which is varied by applying the modulating signal to a voltage variable semiconductor capacitor, another solid-state device. This results in a substantial over-all simplification of the circuit, and the use of the single transistor and the voltage variable capacitor reduces materially the power requirements of the system and also the space and weight required, so that a very small lightweight, low power unit is provided.

It is therefore an object of the present invention to provide an improved angle modulation circuit.

It is a further object of this invention to provide an extremely simple phase modulator employing only semiconductor devices so that the modulator is very compact and light weight, and requires very little power.

A feature of this invention is the provision of a phase modulation circuit wherein a single transistor provides amplification and phase reversal of a radio frequency signal applied across its base and emitter electrodes, and a variable reactance circuit in the collector circuit of the transistor, wherein the active element is a voltage variable capacitor, shifts the phase of the radio frequency signal in response to the application thereto of the modulating signal.

Further objects, features and attendant advantages of the invention will be apparent from the following description when taken in connection with the accompanying drawings, in which.

In practicing the invention there is provided a modulator circuit for use in a phase-modulation transmitter wherein the modulating signal may be an audio signal obtained from a microphone or other signal source, the latter preferably including means for compressing the modulating signal. The carrier signal to be modulated is obtained from a suitable oscillator and transformer coupled between the emitter and base electrodes of a transistor, the applied signal constituting a reference phase. The collector circuit of the transistor includes a tuned tank circuit including a voltage variable capacitor as the tuning element. When the tank circuit is tuned to the oscillator frequency the signal appearing at the collector is 180° out of phase with the reference signal, and when the tank circuit is detuned from resonance the signal at the collector is shifted in phase, leading or lagging depending on whether the tank circuit is tuned above or below the carrier frequency. Tuning of the tank circuit is achieved by applying the modulating signal to the voltage variable capacitor thereby to vary the tuning of the tank circuit in accordance with the modulating signal. The modulated signal is coupled from the tank circuit and in the usual case is applied to a multiplier which raises the frequency of the signal. After multiplication of the signal to a suitable level, it is applied to a power amplifier which provides a modulated signal of the necessary power for the desired communication purposes.

Figure 1:
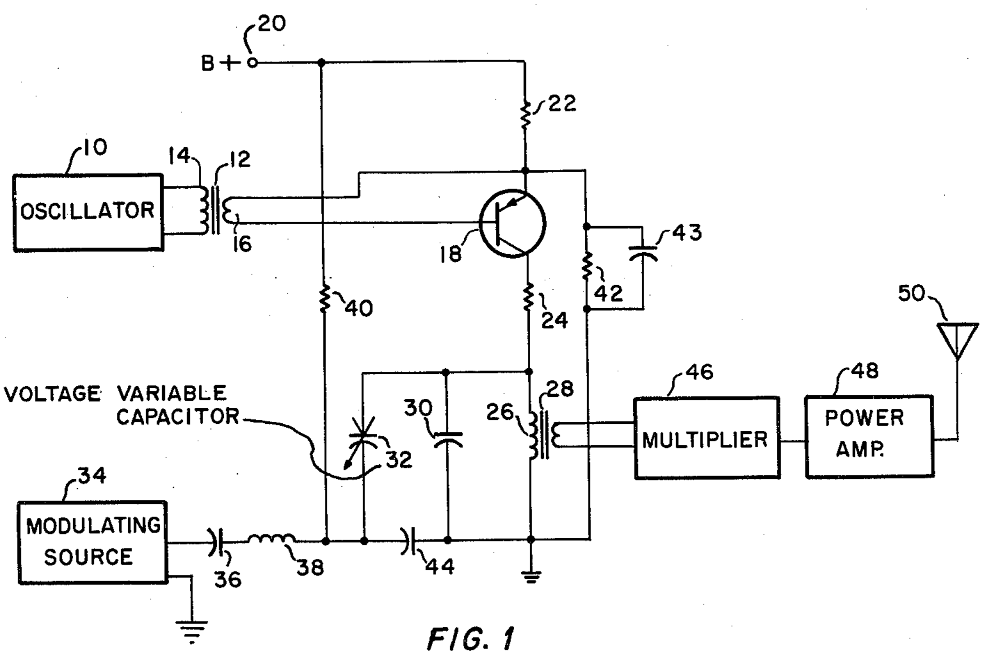
FIG. 1 is a circuit diagram of a transmitter incorporating the modulator in accordance with the invention.

Referring now to the drawings, in FIG. 1 there is illustrated a modulator in accordance with the invention wherein the carrier to be modulated is produced by a source 10. This may be any suitable radio frequency source such as a crystal controlled oscillator, and is preferably coupled to the modulator by a transformer 12 having primary and secondary windings 14 and 16, respectively. The terminals of the secondary winding are connected to the emitter and base electrodes of a transistor 18, the emitter being energized from a source of positive potential, represented by terminal 20, through resistor 22. The collector of the transistor is connected to ground through resistor 24 and the primary winding 26 of a transformer 28, the primary of the transformer serving as the inductance of a parallel tuned circuit. The tank circuit is completed by capacitor 30 and a voltage variable capacitor 32 both connected in parallel with inductance 26. Capacitor 32 is a voltage variable semiconductor capacitor consisting of a P-N junction formed of single-cyrstal silicon by techniques used in the manufacture of semiconductor devices. At a P-N junction the density of charge carriers is reduced virtually to zero when a voltage is applied across the junction in the reverse direction from that causing easy current flow. As the voltage increases, the region of zero carrier density, known as the depletion region, gets wider. In effect, this moves apart the two conducting carriers and decreases the capacity as if there were two metal plates separated by a dielectric whose thickness was variable. The area of the plates remains the same; the dielectric constant is unchanged; but the thickness of the dielectric varies according to the applied voltage. In available devices of this type the capacitance is an inverse function of the square root of the applied voltage. In accordance with the present invention, tuning of the tank circuit is achieved by varying the voltage applied to capacitor 32 in accordance with a modulating signal. Voltage variable capacitors of this type are available from the Hughes Aircraft Company, Los Angeles 45, California, and from Pacific Semiconductors, Inc., who designate their device "Varicap."

A modulating signal is produced by a source 34 which, as was previously stated, may be an audio source such as a microphone, and may include one or more preamplifier stages and preferably a compression system to limit the deviation of the transmitter, particularly if the modulator is used in communication systems. The modulating signal is coupled to one terminal of the voltage variable capacitor 32 through a coupling condenser 36 and a radio frequency choke 38, the latter being provided to prevent radio frequency signals from being coupled into the modulating source.

Figure 2:
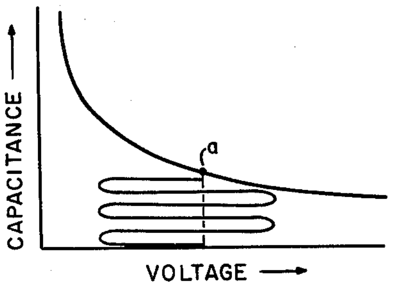
FIG. 2 is a representative voltage-capacitance characteristic of a voltage variable capacitor.

Referring to FIG. 2, which illustrates a typical voltage-capacitance characteristic of a voltage variable capacitor, it will be seen that the capacity of the device decreases as the applied voltage increases. In order to utilize this non-linear characteristic to achieve tuning of the tank circuit the voltage variable capacitor is biased in the reverse direction, by the connection through resistor 40 to the source of B+, by an amount which insures that the voltage swing on the collector of transistor 18 is maintained within a reasonably linear portion of the back bias region of the characteristic. In the disclosed embodiment, this condition is further assured by resistor 42 shunting transistor 18, resistor 24 and inductance 26, resistor 42 having a value equal to that of resistor 22 thereby limiting the voltage swing on the collector of the transistor to a level lower than that of the bias applied to the voltage variable capacitor. In a circuit which has been satisfactorily operated, the voltage variable capacitor 32 was biased in the reverse direction about 12 volts, corresponding to the point *a* of the characteristic of the capacitor (FIG. 2) and the voltage swing at the junction of resistor 24 and inductance 26 limited to approximately 6 volts or less on either side of this voltage, as indicated in FIG. 2. Resistor 24 prevents a low frequency oscillation and a distortion of the R.F. signal on the tank circuit which occurs when the collector signal swings positive sufficiently to forward bias the collector-base diode of transistor 18. Capacitor 43 places the emitter of transistor 18 at R.F. ground.

Figure 3:
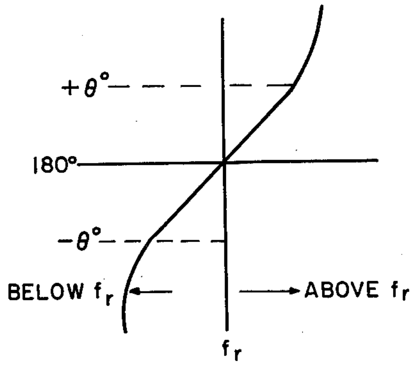
FIG. 3 is a curve illustrating the phase-shifting properties of a single tuned circuit.

With the output of oscillator 10 coupled to the emitter and base electrodes of the transistor 18, a radio frequency signal appears at the collector electrode of the transistor which is 180° out of phase with the applied signal when the tank circuit is tuned to the frequency of oscillator 10. As is well known in the art, when the tank circuit is tuned above and below the input frequency, the phase of the signal at the collector is shifted with respect to the phase which exists at resonance, the relationship between frequency and phase shift being substantially linear over an appreciable range of frequency as depicted in FIG. 3. In a single tuned circuit, the relationship is substantially linear over a range of ±25° from the phase at resonance. In an operative embodiment of the present circuit, approximately ±8° of the available linear region of the characteristic was used. As was noted previously, the tank circuit is tuned at the rate of the modulating signal by varying the voltage applied to the voltage variable capacitor 32. Because of the low D.C. resistance through inductance 26 to ground, the voltage across capacitor 32 varies at the rate of the modulating signal, and consequently the resonant frequency and attendant phase shift of the radio frequency signal are correspondingly varied. Capacitor 44 constitutes a D.C. block to permit biasing of the voltage variable capacitor 32 and is of a value to constitute a short for the alternating current R.F. signal present in the system. From what has been said, it will be apparent that there is developed across inductance 26 a radio frequency signal phase-modulated in accordance with the modulating signal from source 34. It being conventional to perform modulation at a relatively low frequency, the signal is coupled via the secondary of transformer 28 to a multiplier 46 which raises the frequency of the signal. The modulated signal is then coupled to amplifier 48 which provides a modulated signal of the necessary power for the desired communication purposes for application to an antenna 50.

In the circuit in accordance with the invention which has been tested and found satisfactory the following values have been used:

| | | |
|---|---|---|
| Resistors **22** and **42** | ohms | 470 |
| Resistor **24** | do | 1000 |
| Resistor **40** | do | 47,000 |
| Capacitor **30** | picofarads | 50 |
| Capacitor **44** | microfarad | .001 |
| Transistor **18** | | 2N370 |
| Voltage variable capacitor **32** | | 1N950 |
| Capacitor **43** | microfarad | .001 |
| B+ source | volts | 12 |
| Audio input, v. R.M.S. at 1 kc. | | 1 |

As has been mentioned, these values provide a range of phase-shift of plus and minus approximately 8 degrees from the reference phase when the tank circuit is tuned to the oscillator frequency, in this case 7 megacycles.

Although the circuit of FIG. 1 illustrates a voltage divider between B+ and ground to limit the voltage swing on the collector of the transistor 18 to permit using the same voltage source to back bias voltage variable capacitor 32, it is to be understood that the circuit is not limited to these exact details. If a separate source of biasing voltage of suitable potential is available, the resistors 42 and 22 may be eliminated, and the voltage swing determined by the relative values of bias voltages.

It is therefore seen that an effective phase modulation circuit has been provided which is very simple and inexpensive. Because of the very small power requirements of the transistor the power requirements of the circuit are reduced materially over prior reactance-tube modulators. The voltage variable capacitor 32 dissipates no power. The use of these solid-state devices results in a very small unit which is particularly applicable for use in mobile transmitters where space, weight, and power are at a premium.

Although what is now considered to be a preferred embodiment of the invention has been disclosed and described, it is obvious that various modifications and changes can be made therein without departing from the intended scope of the invention as defined in the appended claim.

What is claimed is:

A reactance modulator for producing a variation in the phase of an applied carrier wave in accordance with the amplitude of and at the frequency of a modulating signal comprising, in combination, a transistor having base, emitter and collector electrodes, a source of positive potential, a voltage divider connected between said source of positive potential and ground, a point on said divider constituting a source of forward bias voltage to which said emitter electrode is connected, a source of carrier waves, means including a transformer coupling said source of carrier waves across said base and emitter electrodes, a circuit including a first resistor serially connected with a single parallel tuned inductance-capacitance circuit between said collector electrode and ground, said inductance-capacitance circuit being resonant at the frequency of said carrier waves and including an inductor and a voltage variable capacitor, a second resistor connected between said source of positive potential and one terminal of said voltage variable capacitor for applying a reverse bias voltage to said voltage variable capacitor, and means for superimposing said modulating signal upon said reverse bias voltage to vary the capacitance of said voltage variable capacitor in accordance with the frequency of said modulating signal, the magnitude of said forward bias voltage being less than said reverse bias voltage by an amount greater than the maximum amplitude of said modulating signal, whereby the voltage swing on the collector electrode of said transistor is maintained within a reasonably linear portion of the back bias region of the voltage-capacitance characteristic of said voltage variable capacitor and the resonant frequency of said tuned circuit and attendant phase shift of said carrier wave vary as a function of the amplitude of said modulating signal.

References Cited in the file of this patent

UNITED STATES PATENTS

| | | |
|---|---|---|
| 2,925,561 | MacDonald | Feb. 16, 1960 |
| 2,925,563 | Firestone | Feb. 16, 1960 |
| 2,951,212 | Schmid | Aug. 30, 1960 |
| 2,964,637 | Keizer | Dec. 13, 1960 |
| 2,984,794 | Carter et al. | May 16, 1961 |
| 3,105,205 | Weidnecht et al. | Sept. 24, 1963 |

OTHER REFERENCES

Electronics Industries, December 1959, pages 90–95.